Figure 1:
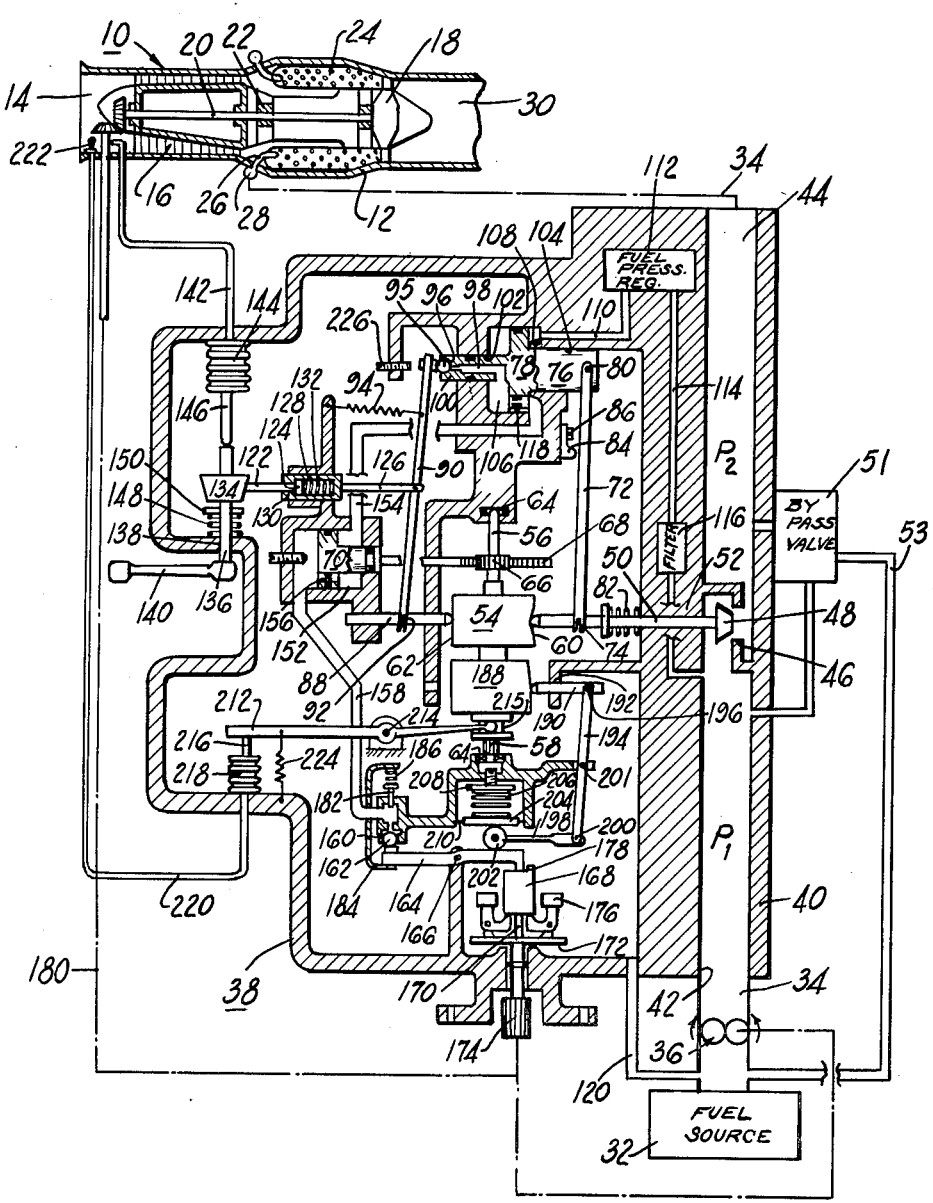

INVENTOR.
HOWARD L. McCOMBS JR.
BY
AGENT

June 30, 1964  H. L. McCOMBS, JR  3,138,926
NORMAL AND ACCELERATION FUEL CONTROL FOR A GAS
TURBINE ENGINE HAVING A VARIABLE DROP CONTROL
Filed March 2, 1961  2 Sheets-Sheet 2

ACCERATION REQUEST

GOVERNING OPERATION AT SELECTED SPEED

DECELERATION REQUEST

INVENTOR.
HOWARD L. McCOMBS JR.
BY
Gordon N. Cheney
AGENT

United States Patent Office 3,138,926
Patented June 30, 1964

3,138,926
NORMAL AND ACCELERATION FUEL CONTROL FOR A GAS TURBINE ENGINE HAVING A VARIABLE DROP CONTROL
Howard L. McCombs, Jr., South Bend, Ind., assignor to The Bendix Corporation, South Bend, Ind., a corporation of Delaware
Filed Mar. 2, 1961, Ser. No. 92,876
7 Claims. (Cl. 60—39.28)

This invention relates to fuel control apparatus and, in particular, to a gas turbine engine fuel control wherein fuel flow to the engine is regulated as a function of a plurality of variable conditions of engine operation.

The conventional gas turbine engine fuel control is designed to accommodate a plurality of input signals corresponding to various conditions of operation among which are control lever position, compressor inlet and/or discharge pressure compressor inlet temperature and engine speed. The conventional fuel control mechanism whereby the plurality of signals corresponding to the variable conditions of operation are sensed and combined to provide control over the fuel regulating valve means when the engine is operating at a governed engine speed and to modify control over the fuel regulating valve means when the engine is accelerating becomes somewhat complex and correspondingly expensive to manufacture and maintain reliable in operation during use. Furthermore, a given fuel control of the above mentioned type cannot be easily modified to vary the relationship of the various conditions of operation and the manner in which they are combined to accommodate different engines having operational characteristics which differ substantially from those of the engine for which the given fuel control is designed. It is therefore an object of this invention to provide a simple and reliable fuel control for controlling fuel flow to a gas turbine engine in response to a plurality of variable conditions of engine operation.

It is an object of this invention to provide an improved control linkage network for a gas turbine engine fuel control which is adapted to combine a plurality of variable conditions of engine operation in a certain manner to provide separate fuel flow schedules for governing operation at a selected speed and for accelerating the engine from one speed to a second selected speed.

It is another object of this invention to provide a single speed responsive element for controlling fuel flow as a function of speed during both governing and accelerating regimes of operation.

Other objects and advantages of the present invention will become apparent to those persons skilled in the art in view of the following detailed description and accompanying drawings wherein:

FIGURE 1 represents a sectional schematic view of a gas turbine engine and associated fuel control apparatus embodying the present invention.

Figure 2:
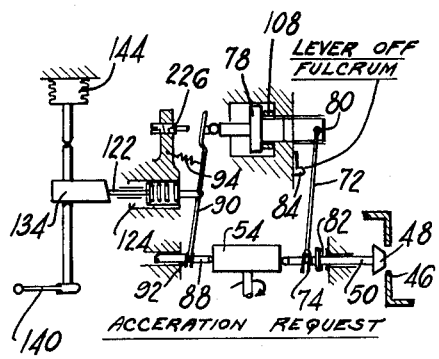
Figure 3:
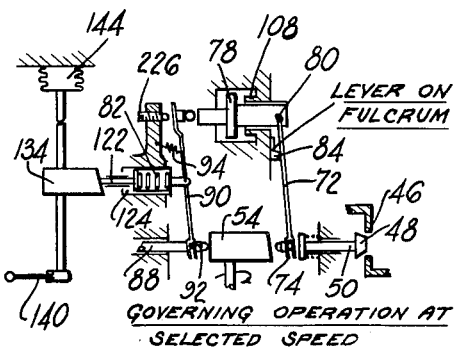
Figure 4:
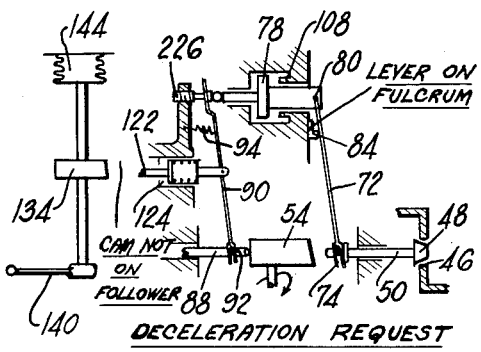

FIGURES 2, 3, and 4 represent schematically three typical relative positions of the cam follower members and lever members and their control effect on the valve means of FIGURE 1 in accordance with governing operation of the engine at a selected engine speed, acceleration operation of the engine to a selected speed, and deceleration operation to a selected speed.

Figure 5:
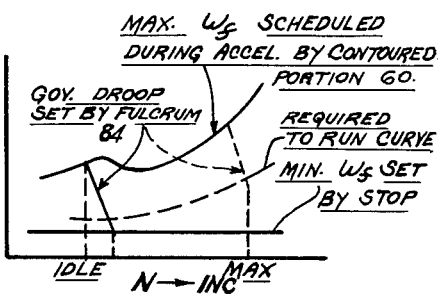

FIGURE 5 represents a plot of fuel flow, $W_f$, vs. engine speed, $N$, and compressor inlet temperature, $T_i$, for a given temperature $T_i$.

Referring to FIGURE 1, numeral 10 designates a gas turbine engine having a casing 12, a forwardly disposed air inlet 14, an axial flow compressor 16 which receives and compresses air from inlet 14 and which is driven by a turbine 18 via a shaft 20 rotatably carried by bearings 22. The compressed air is discharged to a plurality of combustion chambers 24 wherein fuel discharged through fuel nozzles 26 from a fuel manifold 28 is mixed with the air and burned to form hot motive gases which expand through the turbine 18. The remaining unexpended energy of the gases which are exhausted from the turbine 18 is extracted in the form of jet thrust via an exhaust nozzle 30 through which the gases are exhausted to the atmosphere. A second turbine, not shown, may be provided downstream from turbine 18 to extract energy from the hot motive gases for use in driving a propeller as in the case of a turbo-prop aircraft or as a power take-off for applications other than with aircraft.

Fuel flow is supplied to manifold 28 via a fuel source 32 and a fuel conduit 34 connected between the source 32 and fuel manifold 28. An engine driven fuel pump 36 pressurizes the fuel flowing through conduit 32 and a fuel control 38 which embodies the present invention serves to control the flow of pressurized fuel through conduit 32 in accordance a plurality of engine operating conditions including engine speed, $N$, compressor inlet air temperature, $T_i$, and pressure, $P_i$, compressor discharge pressure, $P_c$, and control lever position. To this end, the fuel control 38 constitutes a casing 40 having an inlet port 42 which receives unmetered fuel at pressure $P_1$ from fuel conduit 34 and an outlet port 44 which supplies metered fuel at pressure $P_2$ to fuel conduit 34.

A positionable valve member 48 controls the effective flow area of an orifice 46 arranged in conduit 34 and is attached to a cam follower 50 slidably carried in a suitable opening in casing 52. A conventional bypass mechanism generally shown by 51 includes a valve, not shown, which controls the flow area of a passage 53 connected between discharge and inlet sides of pump 36 which bypasses fuel in excess of that required to maintain a predetermined constant fuel pressure differential $P_1-P_2$ across orifice 46. An annular cam 54 carried by a shaft 56 having a splined section 58 extending along the major portion of its length is provided with separate circumferential portions 60 and 62 which are contoured radially as predetermined functions of engine speed to provide governing and acceleration fuel flows, respectively. The shaft 56 is rotatably supported by anti-friction bearings 64 the inner races of which engage the ends of shaft 56 and the outer races of which are suitably fixedly secured in casing 40. A gear 66 fixedly secured to shaft 56 is engaged by a rack 68 fixedly secured to one end of a servo piston 70 and serves to rotate the shaft 56 as a function of engine speed in response to movement of servo piston 70. The cam follower 50 is urged into engagement with portion 60 by a lever 72 pivotally connected at one end to the cam follower 50 by pin 74 and at the opposite end to a reduced diameter extension 76 of a servo piston 78 by pin 80. A spring 82 suitably interposed between lever 72 and casing 40 serves to bias the lever 72 clockwise about pin 80 to effect engagement of cam follower 50 with portion 60 when the lever 72 is biased out of engagement with an adjustable fulcrum or abutment member 84 by servo piston 78 as shown in FIGURES 1 and 2. The fulcrum member 84 is adjustably secured to casing 40 by a screw 86 threadedly engaged with casing 40. A second cam follower 88 is urged into engagement with portion 62 by a lever 90 pivotally connected at one end to the follower 88 by pin 92. A tension spring 94 interposed between lever 90 and casing 40 serves to load lever 90 in a counterclockwise direction. The opposite end of lever 90 is adapted to engage a ball servo valve 95 which cooperates with a valve seat 96 formed at the discharge end of a passage 98 defined by an annular extension 100 integral with servo piston 78 which annular extension extends through an opening 102 in casing 40. The reduced diameter extension 76 extends from the opposite side of servo piston 78 through an opening 104 in casing 40. The servo piston 78 is slidably carried in a chamber 106 and, as illustrated, is arranged to engage a fixed annular stop 108 which engagement permits the lever 72 to occupy the position shown whereby a slight spaced relationship is maintained between adjustable fulcrum 84 and the lever 72 when the follower 50 occupies a position corresponding to the maximum depression of contoured portion 60. Fuel at constant regulated servo pressure $P_R$ is supplied to chamber 106 via a passage 110 by a conventional fuel pressure regulator generally indicated by 112 which receives fuel at pump discharge pressure $P_1$ via a passage 114 containing filter 116. The fuel pressure regulator 112 is conventional in design and has the well-known function of maintaining a constant supply of servo fuel at a predetermined constant pressure. It is not considered necessary to elaborate on the specific details of the pressure regulator 112 since any person skilled in the art will recognize that any one of a number of conventional mechanisms will serve the required purpose. Fuel at pressure $P_R$ flows to chamber 106 on the one side of servo piston 78 then through a restriction 118 in piston 78 to chamber 106 at the opposite side of piston 78 from which it flows through passage 98 to the interior of casing 40 which is vented to conduit 34 at fuel pump inlet pressure $P_0$ via drain passage 120. The fuel pressure $P_s$ in chamber 106 on the downstream side of restriction 118 is controlled by the ball valve 95. The larger and smaller effective areas of piston 78 exposed to fuel pressure $P_s$ and $P_R$, respectively, have a predetermined fixed area ratio which requires that a corresponding ratio of pressure $P_R$ and $P_s$ be established to stabilize servo piston 78 at any position in its range of travel. The piston 78 will respond to a variation from the predetermined pressure ratio $P_R/P_s$ and continue to move until the fuel pressure $P_s$ is regulated by the action of ball valve 95 to the value required to establish the predetermined ratio $P_R/P_s$. It will be noted that the servo piston 78 is of the follow-up type which means that depending upon the direction of movement of ball valve 95 relative to valve seat 96 the piston will move in the same direction in response to the change in pressure $P_s$ until the position of valve seat 96 relative to ball valve 95 is such that the pressure $P_s$ required to stabilize piston 78 is again re-established. The position of the ball valve 95 for a fixed position of follower 88 is dependent upon the position of a follower 122 attached to lever 124 through collapsible linkage comprising an annular member 124 having a stem 126 extending from its closed end into pivotal engagement with lever 90. The annular member 124 is slidably carried in an opening 128 in casing 40. The follower 122 extends through the opposite end of annular member 124 and is provided with a flanged portion 130 which is biased into engagement with the end portion of annular member 124 by a spring 132 interposed between said flanged portion 130 and the opposite closed end of annular member 124. The follower member 122 is responsive to the position of a cam 134 fixedly secured to a shaft 136 suitably journaled in an opening 138 in casing 40 for axial and rotational movement. The cam 134 is contoured radially as a function of the position of a control lever 140 fixedly secured to the end of shaft 136 which rotates in response to movement of said control lever. The cam 134 is contoured axially as a function of compressor inlet pressure $P_i$ which pressure is transmitted through passage 142 to the interior of a bellows 144 anchored at one end to casing 40 by any suitable means not shown and provided with a closed end having a rod 146 fixedly secured thereto. The rod 146 extends from bellows 144 into engagement with the shaft 136 to thereby displace cam 134 axially in accordance with expansion or contraction of bellows 144. A spring 148 interposed between casing 40 and an annular shoulder 150 formed on shaft 136 serves to bias the shaft 136 into engagement with the end of rod 146.

The servo piston 70, like servo piston 78, presents opposed faces which have a predetermined area ratio relationship which determines the ratio of fuel pressures $P_s'$ and $P_R$ required to stabilize the piston. The piston 70 is slidably carried in a chamber 152 to which fuel at regulated pressure $P_R$ is supplied from chamber 106 via a passage 154. Fuel flows through a restriction 156 suitably secured in piston 70 to chamber 152 adjacent the opposite face of piston 70 then through a passage 158 and valve seat 160 formed at the discharge end thereof and past a ball valve 162 arranged to cooperate with valve seat 160 to the interior of casing 40 at pressure $P_0$. One end of a lever 164 pivotally mounted on a pin 166 secured to casing 40 is adapted to engage the ball valve 162. The opposite end of lever 164 rests against an annular bearing member 168 slidably carried on a rod 170 which is fixedly secured to a rotatable table 172 having a splined extension 174. The annular bearing member 168 is positioned axially on rod 170 in response to the force output of a pair of oppositely disposed centrifugal speed weights 176 pivotally secured to table 172. A notch 178 formed in bearing member 168 serves to prevent the member 168 from rotating with rod 170. The splined extension 174 is driven by the engine shaft 20 through a suitable gear and shafting arrangement generally indicated by 180. The servo pressure $P_s'$ which depends upon the position of ball valve 168 is controlled by the force output of speed weights 176 as a function of engine speed. The force unbalance caused by the variable pressure differentials $P_s'$ and $P_0$ across ball valve 162 is compensated for by a pin 182 slidably carried in an opening between passage 158 at pressure $P_s'$ and the interior of casing 40 at pressure $P_0$. The effective areas of opposite ends of pin 182 exposed to fuel pressures $P_s'$ and $P_0$, respectively, are equal and the resulting force is transmitted to lever 164 via a C-shaped link 184 connected at one end to the lever 164 and loaded at the opposite end by a spring 186 interposed between the link 184 and pin 182.

A cam 188 mounted on shaft 56 for rotatable movement therewith provides a position feedback signal which is transmitted to lever 164 via a follower 190 slidably carried in an opening 192 in casing 40, a lever 194 pivotally connected to one end to follower 190 by a pin 196 and at the opposite end to a link 198 by a pin 200 and intermediate said ends to casing 40 by a pin 201, and a roller member 202 rotatably secured to the opposite end of link 198. The roller member 202 rides against lever 164 and a flat plate 204 which is loaded by a compressor spring 206 interposed between the plate 204 and an adjustable spring retainer 208 secured to casing 40. A flexible annular support 210 suitably fixedly secured to the peripheral edge of plate 204 and casing 40 serves to allow a limited small amount of movement of plate 204 to compensate for adjustments of spring 206. No claim to the feedback mechanism consisting of the roller member 202, plate 204 and associated support 210, spring 206 and lever 164 per se is made and reference is made to copending application Serial No. 749,679, filed July 21, 1958, in the name of Howard L. McCombs, Jr. (common assignee), which discloses and claims an equivalent feedback arrangement for further details of such feedback structure.

It will suffice to say that the effective lever arm of lever 164 between pin 166 and the point of contact with roller member 202 varies with movement of roller member 202 which is loadeed with a constant reference force via spring 206 such that the variable output force of speed weights 176 may be balanced by an equal and opposite forced derived from the constant reference force acting through a variable lever arm.

The cams 54 and 188 are fixed relative to one another and are suitably carried on the splined section 58 of shaft 56 for axial movement and are contoured axially as a function of compressor inlet temperature $T_i$. A lever 212 pivotally secured to casing 40 by pin 214 is sidably carried at one end in an annular recess 215 formed in an integral extension of cam 188 and at the opposite end is engaged by a rod 216 fixedly secured to the free end of a sealed bellows 218 which is anchored to casing 40 by any suitable means, not shown. A tube 220 connects the interior of the bellows 218 with a temperature probe 222 exposed to the air flowing through the engine air inlet 14. The bellows 218 and tube 220 are filled with any suitable conventional material which contracts or expands in response to temperature variations at probe 222 to thereby effect a corresponding contraction of expansion of bellows 218 which movement results in actuation of lever 212 and cams 54 and 188. A tension spring 224 connected to lever 212 and casing 40 holds the lever 212 against rod 216.

*Operation*

Assuming engine operation to be stable at a selected engine speed, the lever 90 will occupy a position as shown in FIGURE 3 wherein the fulcrum of lever 90 i.e., the pivot connecting lever 90 and stem 126 is biased by annular member 124 in response to follower 122 and cam 134 in accordance with the selected position of control lever 140 and compressor inlet pressure $P_i$. The spring 132 holds the flanged portion 130 of follower 122 into engagement with the end of annular member 124 which, in effect, creates a solid link between follower 122 and rod 126. The lever 90 is positioned by follower 88 in response to the cam 54 which occupies a position in response to existing engine speed. Thus the ball valve 95 also occupies a position which is a function of control lever position and compressor inlet pressure, $P_i$, and existing engine speed and compressor inlet temperature, $T_i$, and servo piston 78 is biased accordingly to a position whereby lever 72 which rests on fulcrum 84 is pivoted counterclockwise to effect disengagement of follower 50 with cam 54 which, in turn, results in the position of follower 50 and valve 48 being a function of control lever position (modified by compressor inlet pressure, $P_i$) and existing engine speed (modified by compressor inlet temperature, $T_i$).

Now, assuming a request for an acceleration to maximum engine speed, the cam 134 is rotated by control lever 140 causing follower member 122 to move toward the right with reference to FIGURE 2 whereupon spring 132 is compressed driving annular member 124 toward the right which, in turn, causes the lever 90 to pivot clockwise about pin 92 and urge ball valve 95 toward valve seat 96. The resulting increase in fuel pressure $P_s$ causes servo piston 78 to move against stop 108 which fixes the position of piston 78 which, in turn, prevents further movement of lever 90. The annular member 124 and spring 132 acts as a collapsing linke between follower 122 and stem 126 with the spring 132 being compressed between flanged portion 1330 and anular member 124 when the movement of lever 90 is restricted in the abovementioned manner. The servo piston 78 biases lever 72 out of engagement with fulcrum 84 whereupon the spring 82 urges lever 72 clockwise about pin 80 causing follower 50 to engage cam 54 which, in turn, results in the position of follower 50 being a function of existing engine speed modified by compressor inlet temperature only. As the engine accelerates, fuel flow, $W_f$, to the engine may be controlled to a variable degree over a portion of the speed range of the engine to avoid the characteristic range of unstable operation commonly known as "compressor stall" by suitable contouring of portion 69. FIGURE 5 illustrates one fuel flow, $W_f$, pattern obtained as a function of engine speed, N, and compressor inlet temperature, $T_i$, for a given temperature $T_i$. However, any maximum fuel flow schedule during an engine acceleration may be obtained by contouring the cam 54, as desired. As the selected engine speed is approached, cam 54 rotates to a position whereby the radially decreasing contour of portion 62 permits lever 90 to pivot counterclockwise whereupon the spring 132 expands urging flanged portion 130 into engagement with the adjacent end of annular member 124, which, in effect, creates a solid link between follower 122 and rod 126. Further counterclockwise movement of lever 90 results in movement of ball valve 95 and the aforementioned follow-up portion of servo piston 78 until lever 72 contacts fulcrum 84 whereupon follower 50 is biased out of engagement with cam 54. Continued counterclockwise movement of lever 90 results in counterclockwise movement of lever 72 about fulcrum 84 and concomitant movement of follower 50 away from cam 54 such that valve 48 closes accordingly to cause fuel flow to decrease along the governor break line to the required-to-run fuel flow curve shown in FIGURE 5 where fuel flow is held constant at the requested maximum speed in response to stabilization of lever 90 and sero piston 78. Of course, variations in compressor inlet temperature, $T_i$, will cause axial movement of cam 54 to thereby modify the fuel flow to the engine and effect a modification in engine speed as a function of inlet temperature, $T_i$.

Declaration of the engine from the aforementioned maximum speed is accomplished by rotating the control lever to idle position, for example, whereby cam 134 rotates and moves out of engagement with follower 122. The annular member 124 is then free to move towards cam 134 in response to spring 94 actuating lever 90 counterclockwise about pin 92 as shown in FIGURE 4. A predetermined minimum fuel flow is maintained during engine decleration by means of an adjustable stop 226 threadedly engaged with casing 40 which limits the counterclockwise movement of lever 90 and thus fixes the position of ball valve 95 such that the servo piston 78 and lever 72 are positionally controlled accordingly to prevent valve 48 from moving to a fully closed position.

It will be understood that the disclosed arrangement whereby cam 134 is biased as a function of compressor inlet pressure, $P_i$, and cams 54 and 58 are biased as a function of compressor inlet temperature, $T_i$, is readily adaptable to change. For instance, with some engines it may be desirable to bias cam 134 as a function of compressor inlet temperature, $T_i$, or some other variable condition of engine operation and/or bias cams 54 and 58 as a function of compressor inlet pressure, $P_i$, or some other variable condition of engine operation. In any event, such modification of the control system shown in FIGURE 1 can be accomplished, as desired, with relative ease.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment. Also, while details concerning various access parts and fluid seals where required for the various component parts are not shown or described, such details may be easily supplied with ordinary engineering skill by those persons skilled in the art.

I claim:

1. Fuel control apparatus for a combustion engine having a combustion chamber and a control lever for controlling the operation of the engine, the combination of a source of fuel, a fuel conduit connected to deliver fuel from said source to said combustion chamber, positionable valve means operatively connected to said fuel conduit for controlling fuel flow therethrough, means for actuating said valve means including a rotatably and axially movable cam member having first and second contoured portions radially, means responsive to engine speed operatively connected to said cam member for actuating the same as a function of engine speed, means responsive to a variable condition associated with engine operation operatively connected to said cam member for actuating the same as a function of said variable condition, a first follower member responsive to said first contoured portion, a spring loaded second follower member operatively connected to said valve means and responsive to said second contoured portion for controlling the position of said valve means, first and second lever means pivotally connected to said first and second follower members, respectively, servo mechanism responsive to the position of said first lever means operatively connected to said second lever means for controlling the position of said second lever means, linkage means operatively connected to said control lever and said first lever for controlling the position of said first lever as a function of control lever position, and adjustable abutment means engageable with said second lever means for biasing said second follower member out of engagement with said second contoured portion during governing operation at a selected engine speed, said second lever means being urged out of engagement with said last named means by said servo mechanism whereupon said second follower member is biased into engagement with said second contoured portion during an acceleration of the engine to a selected speed, said abutment means acting as a fulcrum for said second lever means and being adjustable to modify the lever arm thereof and thus the governor droop rate accordingly.

2. In fuel control apparatus as claimed in claim 1 wherein said cam member is rotatably and axially movable as a function of engine speed and said variable condition associated with engine operation, respectively.

3. In a fuel control system as claimed in claim 1 wherein said combustion engine includes an air compressor and said variable condition of operation is the air temperature at the inlet to said compressor.

4. In fuel control apparatus as claimed in claim 1 including means responsive to a second variable condition associated with engine operation operatively connected to said linkage means for modifying the position of said first lever member as a function of said second variable condition.

5. In fuel control apparatus as claimed in claim 4 wherein said combustion engine includes an air compressor and said variable conditions associated with engine operation are compressor inlet temperature and pressure.

6. In fuel control apparatus for a combustion engine having a combustion chamber and a control lever for controlling the operation of the engine, the combination of a source of pressurized fuel, a fuel conduit connected to deliver fuel from said source to said combustion chamber, positionable valve means operatively connected to said fuel conduit for controlling fuel flow therethrough, means for actuating said valve means including a movable cam having first and second contoured portions, means responsive to engine speed operatively connected to said cam for actuating the same as a function of engine speed, a first follower member responsive to said first contoured portion, a second follower member responsive to said second contoured portion and operatively connected to said valve means for actuating the same, resilient means operatively connected to said second follower member for biasing said second follower member into contact with second contoured portion, first and second lever members pivotally connected at one end to said first and second follower members, respectively, a fluid operated servo piston pivotally connected to the opposite end of said second lever, servo valve means operatively connected to the opposite end of said first lever member for controlling the pressure of the fluid applied to said servo piston as a function of the position of said lever, linkage means operatively connected to said control lever and said first lever member for controlling the position of said first lever member as a function of control lever position, and abutment means engageable with said second lever member for biasing said second follower member out of engagement with said second contoured portion, said second lever member being actuated into engagement with said abutment means whereupon said positionable valve means is controlled in accordance with the position of said servo piston as a function of control lever position and engine speed during governing operation at a selected engine speed, said second lever member being actuated out of engagement with said abutment means whereupon said positionable valve means is controlled as a predetermined function of engine speed by said second follower member in response to said second contoured portion during an acceleration of the engine to a selected engine speed, said abutment means acting as a fulcrum for said second lever member and being adjustable along the length of said second lever member to thereby vary the effective lever arm thereof and modify the governor droop rate accordingly.

7. In fuel control apparatus for a combustion engine having an air compressor, a combustion chamber and a control lever for controlling the operation of the engine, the combination of a source of pressurized fuel, a fuel conduit connected to deliver fuel from said source to the combustion chamber, positionable valve means operatively connected to said fuel conduit for controlling fuel flow therethrough to the combustion chamber, control means for actuating said valve means including a first rotatably movable cam having first and second contoured portions, a second rotatably movable cam, means responsive to engine speed operatively connected to said first and second cam for rotating the same as a function of engine speed, feedback means including a follower member engageable with said second cam operatively connected to said speed responsive means for stabilizing the effect of said speed responsive means on said first and second cams, a first follower member responsive to said first contoured portion, a second follower member responsive to said second contoured portion and operatively connected to said valve means for actuating the same, resilient means operatively connected to said second follower member for biasing said second follower into contact with said second contoured portion, first and second lever members pivotally connected at one end to said first and second follower member, respectively, a fluid operated servo piston pivotally connected to the opposite end of said second lever, servo valve means operatively connected to the opposite end of said first lever member for controlling the pressure of the fluid applied to said servo piston as a function of the position of said lever, linkage means operatively connected to said control lever and said first lever member for controlling the position of said first lever member as a function of control lever position, adjustable abutment means engageable with said second lever member for biasing said second follower member out of engagement with said second contoured portion whereupon the position of said second lever member and thus the position of said second follower member is controlled by said servo piston as a function of throttle lever position and engine speed during governing operation at a selected engine speed, said second lever member being actuated out of engagement with said abutment means by said servo piston whereupon said second follower member is biased into engagement with said second contoured portion and positioned as a predetermined function of engine speed in response to said second contoured portion during an acceleration of the engine to a selected speed, said abutment means acting as a fulcrum for said second lever member and being adjustable to thereby vary the effective lever arm thereof and modify the governor droop rate accordingly, and means responsive to the air pressure at the inlet to said compressor operatively connected to said linkage means for modifying the position of said first lever member as a function of compressor inlet air pressure.

References Cited in the file of this patent

UNITED STATES PATENTS

| | | |
|---|---|---|
| 2,822,666 | Best | Feb. 11, 1958 |
| 2,906,093 | Robinson | Sept. 29, 1959 |
| 2,941,602 | Coar | June 21, 1960 |
| 3,023,801 | Kinney | Mar. 6, 1962 |
| 3,034,583 | Best | May 15, 1962 |

FOREIGN PATENTS

| | | |
|---|---|---|
| 64,638 | France | Nov. 30, 1955 |
| | (1st addition to No. 992,396) | |
| 820,913 | Great Britain | Sept. 30, 1959 |

UNITED STATES PATENT OFFICE
CERTIFICATE OF CORRECTION

Patent No. 3,138,926                                                                 June 30, 1964

Howard L. McCombs, Jr.

It is hereby certified that error appears in the above numbered patent requiring correction and that the said Letters Patent should read as corrected below.

Column 4, line 57, for "to", first occurrence, read -- at --; column 4, lines 62 and 63, for "compressor" read -- compression --; column 5, line 6, for "loadeed" read -- loaded --; line 68, for "linke" read -- link --; line 70, for "1330" read -- 130 --; same line 70, for "anular" read -- annular --; column 6, line 8, for "69" read -- 60 --; line 32, for "sero" read -- servo --; line 37, for "Declaration" read -- Deceleration --; same column 6, line 45, for "decleration" read -- deceleration --.

Signed and sealed this 2nd day of March 1965.

(SEAL)
Attest:

ERNEST W. SWIDER
Attesting Officer

EDWARD J. BRENNER
Commissioner of Patents